United States Patent [19]

Aiba

[11] Patent Number: 5,552,894

[45] Date of Patent: Sep. 3, 1996

[54] IMAGE PROCESSING INCLUDING IDENTIFICATION OF A SPECIFIC IMAGE AND CONVERSION THEREOF IN A PREDETERMINED MANNER

[75] Inventor: Yoshinobu Aiba, Yokohama, Japan

[73] Assignee: Canon Kabushiki Kaisha, Tokyo, Japan

[21] Appl. No.: 971,064

[22] Filed: Nov. 3, 1992

[30] Foreign Application Priority Data

Nov. 7, 1991 [JP] Japan .................................. 3-319863

[51] Int. Cl.⁶ .............................. H04N 1/40; H04N 1/46; G06K 9/40; G06K 9/42
[52] U.S. Cl. ......................... 358/298; 358/530; 382/162; 382/299
[58] Field of Search .......................... 358/298, 515–523, 358/528, 530, 534, 448, 501; 382/17, 47, 54, 55, 190, 298, 254, 258, 299; 395/128, 131

[56] References Cited

U.S. PATENT DOCUMENTS

| | | | |
|---|---|---|---|
| 3,739,084 | 6/1973 | Heinrich | 178/6 |
| 4,004,079 | 1/1977 | Boston | 358/256 |
| 4,369,461 | 1/1983 | Tamura | 358/75 |
| 4,667,250 | 5/1987 | Murai | 358/298 X |
| 4,703,318 | 10/1987 | Haggerty | 340/734 X |
| 4,860,115 | 8/1989 | Ogura | 358/443 |
| 4,910,607 | 3/1990 | Kita et al. | 358/400 |
| 4,929,979 | 5/1990 | Kimoto et al. | 358/457 |
| 4,980,758 | 12/1990 | Matsunawa et al. | 358/75 |
| 4,980,760 | 12/1990 | Hiratsuka et al. | 358/80 |

FOREIGN PATENT DOCUMENTS

3802736  8/1988  Germany .................... H04N 1/46

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing apparatus includes an input unit for inputting image information, a setting unit for setting a mode associated with a resolution, a detection unit for detecting a specific image in the image information input from the input unit, a processing unit for converting the specific image in the image information detected by the detection unit into a pattern image having a predetermined resolution, and an output unit for outputting image information from the processing unit. The processing unit changes the resolution of the pattern image according to the mode set by the setting unit.

12 Claims, 12 Drawing Sheets

PRINTER MODE

FACSIMILE FINE MODE

FACSIMILE NORMAL MODE

FIG.11D
FACSIMILE NORMAL MODE

FIG.11C
FACSIMILE FINE MODE

FIG.11B
PRINTER MODE

FIG.11A
ORIGINAL
BLUE
RED

FIG.12

IMAGE PROCESSING INCLUDING IDENTIFICATION OF A SPECIFIC IMAGE AND CONVERSION THEREOF IN A PREDETERMINED MANNER

BACKGROUND OF THE INVENTION

1. Field of the Invention

The present invention relates to an image processing apparatus and an image processing method for converting a specific image in an input image into a pattern image.

2. Related Background Art

In a conventional image processing apparatus such as a facsimile apparatus for transferring image information, an original image is read by a photoelectric conversion element such as an image sensor, and is converted into a binary time-serial electrical signal. At this time, only the density of the original image is detected, and colors are not identified. For this reason, in a reproduced image, although a black portion of the original image is reproduced, colored figures or tables are reproduced in black and white, and the original image cannot be faithfully reproduced. For this reason, a halftone reproduction method such as a dither method, an error diffusion method, or the like is adopted to reproduce a halftone image. However, when density differences in units of colors are small, or gray is used, it is very different to express differences in colors. Although a copying machine, which reproduces an image by means of a multi-value output (i.e., plural bits per pixel per color), can express density differences, when density differences in units of colors are small, or gray is used, it is also very different to express differences in colors. For this reason, in the field of, e.g., copying machines, image processing for recognizing colors, converting information of each respective color into predetermined patterns corresponding to the various colors, and outputting the converted patterns has been proposed.

However, with an MH or MR method as an encoding method as in the GIII standards, a halftone image based on the dither method or the error diffusion method undesirably has a huge information volume, which causes increases in communication time and communication cost. In addition, it is difficult to reproduce differences in colors, as described above. When color pattern conversion is performed at a resolution of 400 dpi, if the pattern is converted to the resolutions of 8 pel and 3.85 line/mm of the GIII standards in a facsimile transmission, the pattern is painted solid, and as a result, reproducibility is impaired. Furthermore, when an arrangement for generating only a binary pattern is adopted in correspondence with a facsimile image, the performance of the multi-value pattern copying machine cannot be utilized.

SUMMARY OF THE INVENTION

It is an object of the present invention to solve the above-mentioned problems.

It is another object of the present invention to provide an image processing apparatus, which can output a pattern without painting it even when a pattern-converted image is output at any resolution.

It is still another object of the present invention to provide an image processing apparatus, which can output a pattern-converted image in correspondence with any output means.

Other objects and features of the present invention will become apparent from the following description taken in conjunction with the accompanying drawings.

DESCRIPTION OF THE PREFERRED EMBODIMENTS

The preferred embodiments of the present invention will be described hereinafter with reference to the accompanying drawings.

Figure 1:
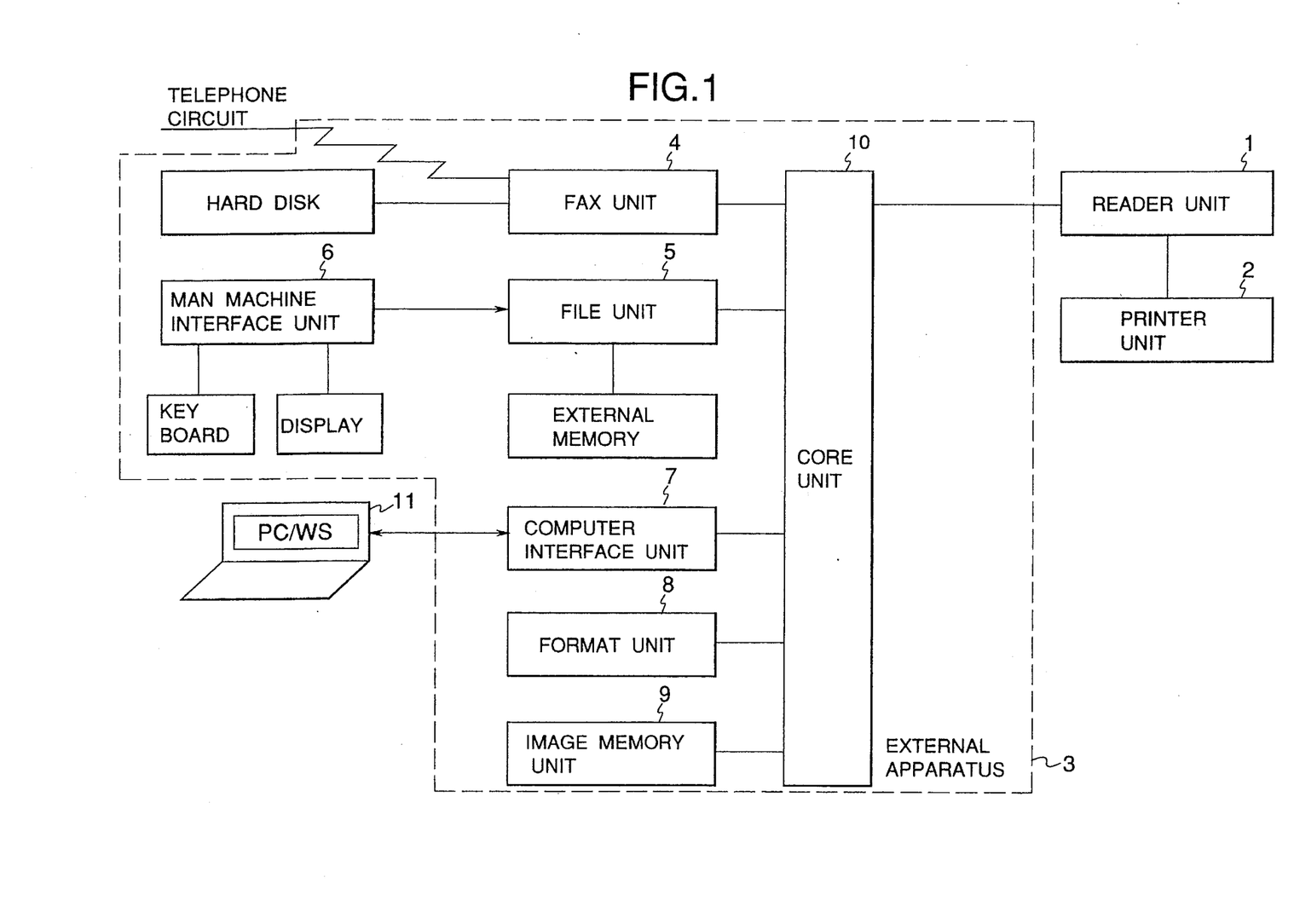
FIG. 1 is a block diagram showing an arrangement of the overall image processing apparatus according to an embodiment of the present invention.

FIG. 1 is a block diagram showing an arrangement of the overall image processing apparatus according to an embodiment of the present invention.

As shown in FIG. 1, an image processing apparatus of this embodiment comprises an image input apparatus (to be referred to as a reader unit hereinafter) 1 for reading an original image, and converting the read image into image data, an image output apparatus (to be referred to as a printer unit hereinafter) 2, having cassettes for a plurality of types of recording sheets, for outputting image data onto a recording sheet as a visible image according to a print command, and an external apparatus 3 electrically connected to the reader unit 1. The external apparatus 3 is constituted by a FAX unit 4, a file unit 5, a man-machine interface unit 6 connected to the file unit 5, a computer interface unit 7 for connecting a computer 11, a format unit 8 for converting information from the computer 11 into a visible image, an image memory unit 9 for storing information from the reader unit 1, and temporarily storing information sent from the computer 11, and a core unit 10 for controlling the respective units in the external apparatus 3.

The functions of the respective units will be described in detail below.

Figure 2:
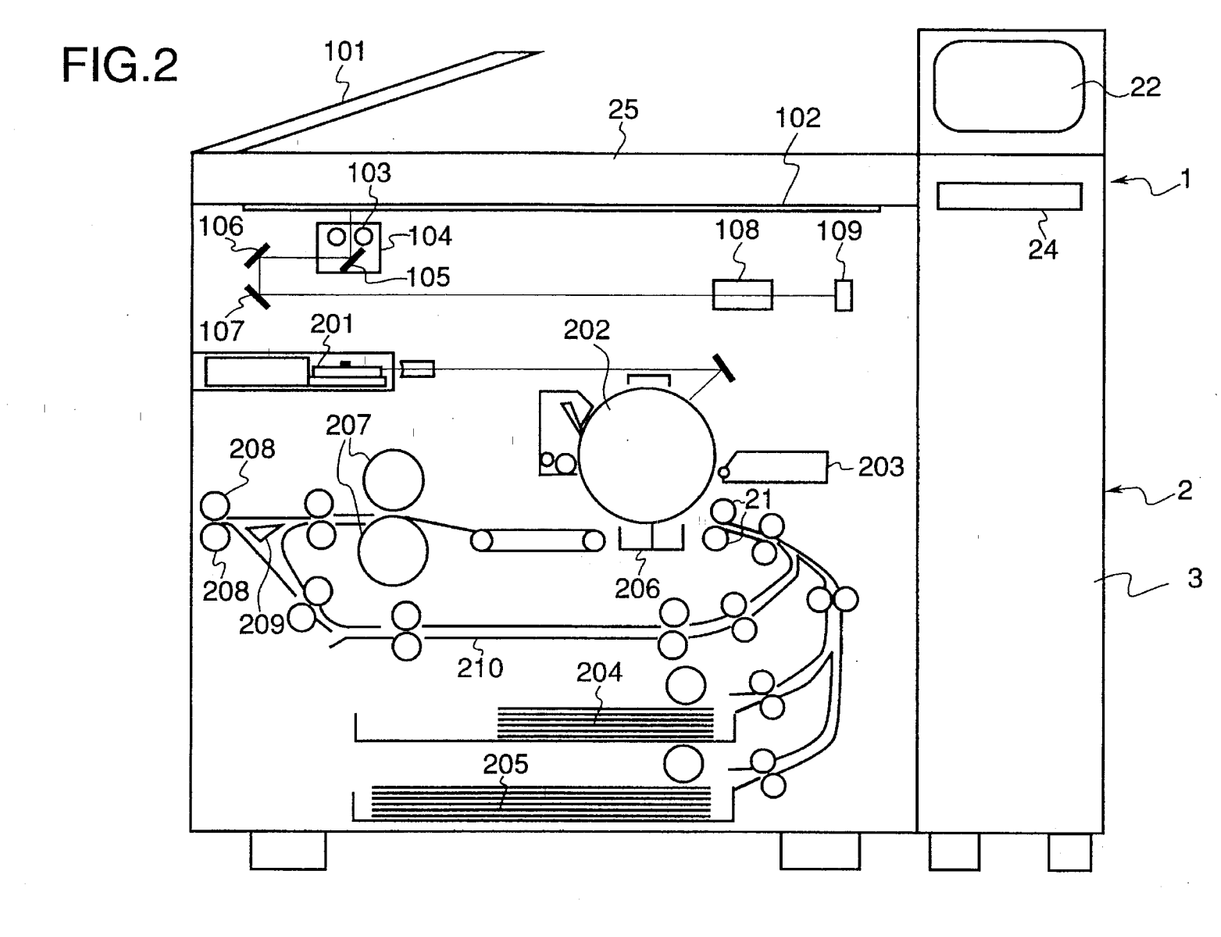
FIG. 2 is a sectional view showing an internal arrangement of the image processing apparatus.

The details of the reader unit 1 will be described below with reference to FIG. 2. Originals stacked on an original feeder 101 are fed onto the surface of an original table glass 102 one by one. When an original is fed, a lamp 103 of a scanner unit 104 is turned on, and at the same time, the scanner unit 104 is moved to radiate light onto the original. The light reflected by the original is transmitted through a lens 108 via mirrors 105, 106, and 107, and thereafter, is input to a CCD image sensor unit 109 (to be referred to as a CCD hereinafter).

Figure 3:
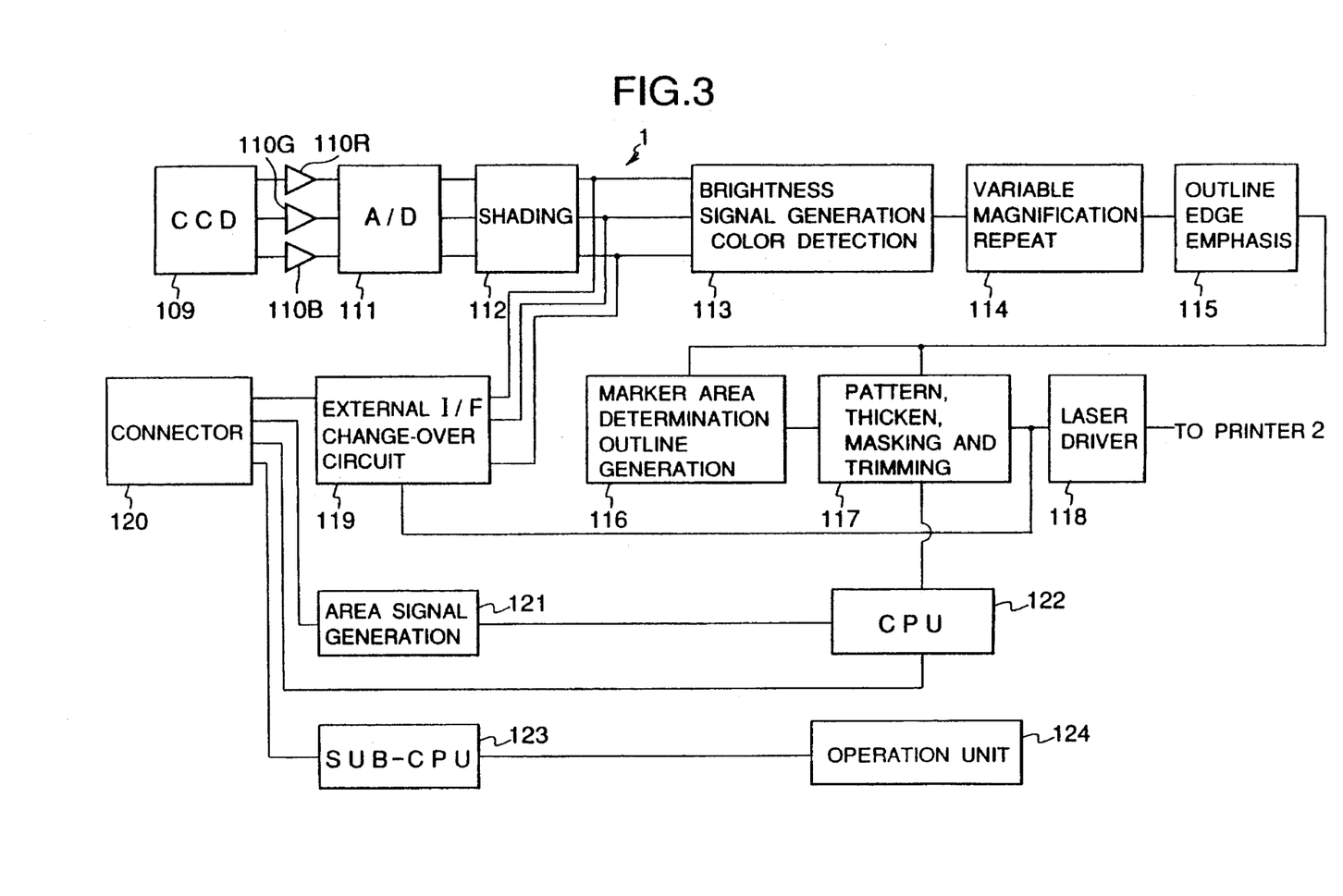
FIG. 3 is a block diagram showing an arrangement of a reader unit 1.

Image processing of image information input from the CCD 109 will be described in detail below with reference to FIG. 3. Image information input to the CCD 109 is photoelectrically converted into electrical signals, representing respective color components. The color data red (R), green (G), and blue (B) from the CCD 109 are amplified by amplifiers 110R, 110G, and 110B in correspondence with input signals of the next A/D converter 111. The output signals including color data R, G, and B are input to a shading circuit 112, and are corrected according to light distribution nonuniformity of the lamp 103 and sensitivity nonuniformity of the CCD 109. Signals output from the shading circuit 112 are input to a brightness signal generation•color detection circuit 113 and an external interface (I/F) change-over circuit 119.

The brightness signal generation•color detection circuit 113 performs a calculation of the color data R, G, and B input from the shading circuit 112 according to the following equation to obtain a brightness signal Y:

$$Y=0.3R+0.6G+0.1B$$

Furthermore, the brightness signal generation•color detection circuit 113 has a color detection circuit for discriminating seven colors from the color data R, G, and B, and outputting signals corresponding to the detected colors. The output signal from the brightness signal generation•color detection circuit 113 is input to a variable magnification•repeat circuit 114. A variable magnification circuit portion of the variable magnification•repeat circuit 114 performs subscanning variable magnification processing according to the scanning speed of the scanner unit 104. A repeat circuit portion of the variable magnification•repeat circuit 114 can output a plurality of identical images. An outline•edge emphasis circuit 115 emphasizes a high-frequency component of a signal output from the variable magnification•repeat circuit 114 to obtain edge emphasis data and outline data. The signal output from the outline•edge emphasis circuit 115 is input to a marker area determination-outline generation circuit 116 and a circuit 117 for performing pattern conversion, thickening, masking, and trimming operations (to be referred to as a pattern circuit 117 hereinafter).

The marker area determination•outline generation circuit 116 reads a portion on an original written with a marker pen of a designated color, and generates marker outline data. The next pattern circuit 117 performs thickening, masking, and trimming operations based on the outline data. In addition, the pattern circuit 117 performs pattern conversion on the basis of a color detection signal from the brightness signal generation•color detection circuit 113.

The output signal from the pattern circuit 117 is input to a laser driver 118, and is converted into a signal for driving a laser of the printer unit 2. The signal output from the laser driver 118 is input to the printer unit 2, and is used to effect image formation to produce a visible image.

The external I/F change-over circuit 119 for interfacing with the external apparatus 3 will be described below. When image information from the reader unit 1 is to be output to the external apparatus 3, the external I/F change-over circuit 119 outputs image information from the image information from the pattern circuit 117 through a connector 120. When the reader unit 1 receives image information from the external apparatus 3, the external I/F change-over circuit 119 inputs image information from the connector 120 to the brightness signal generation•color detection circuit 113.

The above-mentioned image processing circuits operate according to instructions from a CPU 122. An area signal generation circuit 121 generates various timing signals necessary for the above-mentioned image processing operations on the basis of values set by the CPU 122. The CPU 122 communicates with the external apparatus 3 using its internal communication function. A SUB•CPU 123 controls an operation unit 124, and communicates with the external apparatus 3 using its internal communication function.

The printer unit 2 will be described below with reference to FIG. 2.

A signal input from the reader unit 1 to the printer unit 2 is converted into an optical image signal by an exposure control unit 201, and the optical image signal is radiated onto a photosensitive body 202. A latent image formed on the photosensitive body 202 by the radiated optical image signal is developed by a developing unit 203. A transfer sheet is conveyed from a transfer sheet stack unit 204 or 205 in synchronism with the formation of the latent image, and the image developed on the photosensitive body 202 is transferred by a transfer unit 206 to the tranfer sheet positioned by registration rollers 21. The transferred image is fixed onto the transfer sheet by a fixing unit 207, and the transfer sheet is discharged outside the apparatus from a paper discharge unit 208. Note that a signal input to the printer unit 2 is an 8-bit signal, and both the main-scanning and subscanning resolutions are 400 dpi. The image developed in this manner or an image read by the reader unit 1 may be stored in a disk device 24 or may be displayed on a display device 22. In general, the image is output by the printer unit 2.

A method of recording sequentially read images onto two surfaces of a single transfer sheet will be described below. A transfer sheet subjected to fixing by the fixing unit 207 is conveyed to the paper discharge unit 208, and is then conveyed to a re-feed transfer sheet stack unit 210 while the convey direction of the transfer sheet is reversed by changing over a convey direction change-over member 209. When the next original is prepared, recording is performed in substantially the same process as described above, except that the transfer sheet is fed from the re-feed transfer sheet stack unit 210. In this manner, two originals images are respectively output onto the upper and lower surfaces of a single transfer sheet.

The external apparatus 3 is connected to the reader unit 1 through a cable, and the core unit 10 in the external apparatus 3 controls signal processing and various functions according to an input signal from the reader unit 1. The FAX unit 4 performs facsimile transmission/reception. The file unit 5 converts various kinds of original information into electrical signals, and stores the original information. The computer interface unit 7 interfaces the format unit 8 for developing code information from the computer 11 into image information with the computer 11. The image memory unit 9 stores information from the reader unit 1, and temporarily stores information sent from the computer 11.

The functions of the respective units of the external apparatus 3 will be described in detail below.

Figure 4:
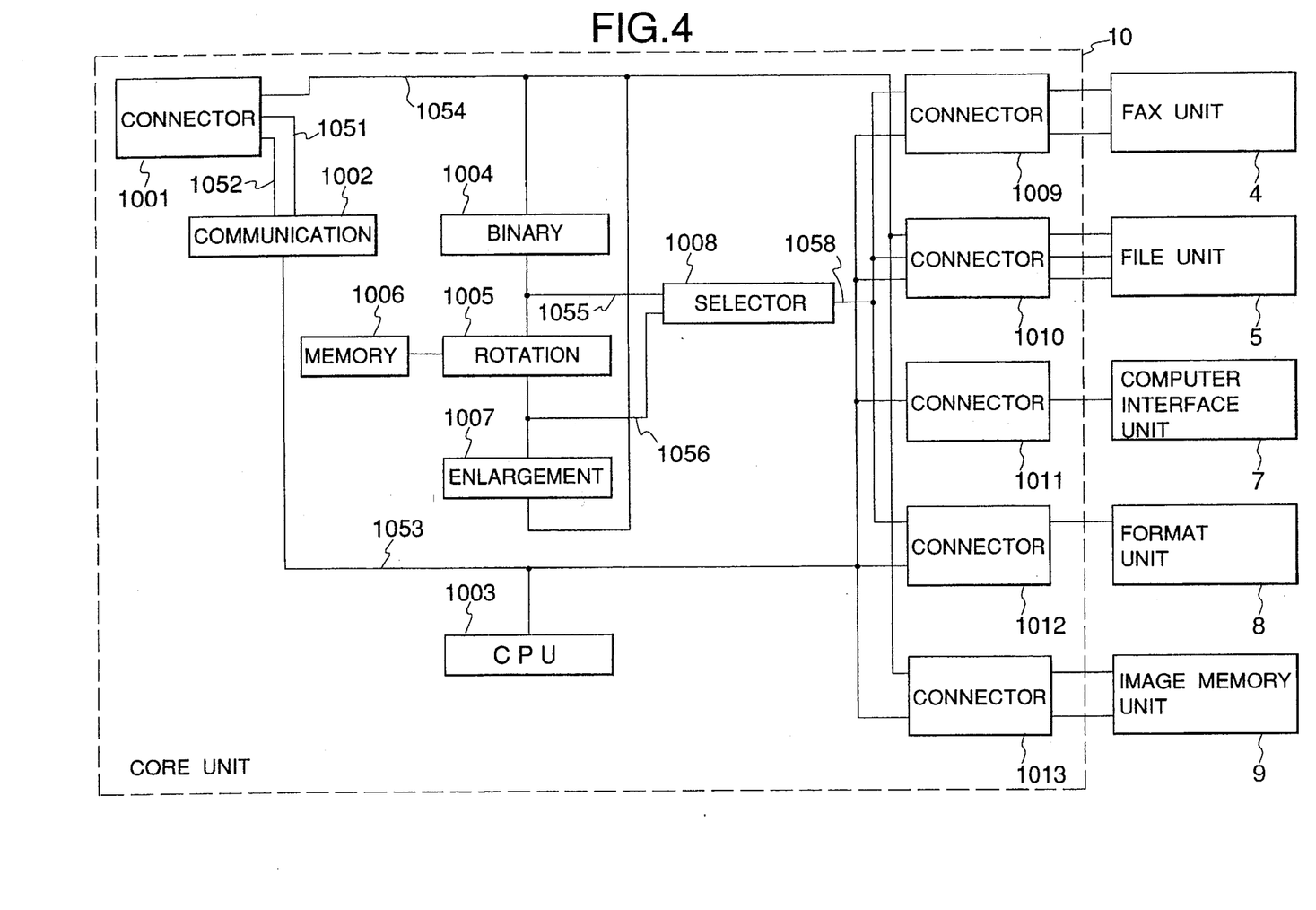
FIG. 4 is a block diagram showing an arrangement of an external apparatus 3.

The core unit 10 will be described below with reference to FIG. 4. An I/O connector 1001 of the core unit 10 is connected to the I/O connector 120 of the reader unit 1 through a cable.

The connector 1001 is provided with three different signal lines. More specifically, a signal line 1054 transmits an 8-bit multi-value video signal, and a control signal. A signal line 1051 transmits a signal for performing a communication with the CPU 122 in the reader unit 1. A signal line 1052 transmits a signal for performing a communication with the SUB•CPU 123 in the reader unit 1. Signals on the signal lines 1051 and 1052 are processed by a communication IC 1002 according to a communication protocol, and the IC 1002 transmits communication information to a CPU 1003 through a CPU bus 1053.

The signal line 1054 is a bidirectional signal line, and can receive information from the reader unit 1 by the core unit 10 or can output information from the core unit 10 to the reader unit 1. The signal line 1054 is connected to a binary circuit 1004 and connectors 1010 and 1013. The connector 1010 is connected to the file unit 5, and the connector 1013 is connected to the image memory unit 9.

The binary circuit 1004 converts an 8-bit multi-value signal from the signal line 1054 into a binary signal. The binary circuit 1004 has a simple binary conversion function for binary-converting a multi-value signal from the signal line 1054 with a fixed slice level, a binary conversion function for binary-converting a multi-value signal with a variable slice level, which varies according to pixel values around a pixel of interest, and a binary conversion function based on an error diffusion method. An output signal from the binary circuit 1004 is input to a rotation circuit 1005 and a selector 1008 through a signal line 1055.

The rotation circuit 1005 functions together with a memory 1006, and a binary signal (multi-value signal information output from the reader unit 1) from the binary circuit 1004 is stored in the memory 1006 under the control of the rotation circuit 1005. The rotation circuit 1005 rotates and reads out information from the memory 1006 according to an instruction from the CPU 1003. The output signal from the rotation circuit 1005 is input to an enlargement circuit 1007 through a signal line 1056.

The enlargement circuit 1007 converts the binary signal from the rotation circuit 1005 into a multi-value signal. More specifically, when the binary signal is "0", the circuit 1007 converts it into 00hex; when the signal is "1", the circuit 1007 converts it into FFhex. The enlargement circuit 1007 can independently set enlargement magnifications in the X- and Y-directions according to an instruction from the CPU 1003. Enlargement is attained by a linear interpolation method. The output signal from the enlargement circuit 1007 is input to the connectors 1001, 1010, and 1013 through the signal line 1054 according to an instruction from the CPU 1003.

The output signal from the binary circuit 1004 and the output signal from the rotation circuit 1005 are input to the selector 1008 respectively through the signal lines 1055 and 1056, and are selected according to an instruction from the CPU 1003. The output signal from the selector 1008 is supplied to a connector 1009, the connector 1010, and a connector 1012 through a signal line 1058.

The CPU bus 1053 is connected to the CPU 1003, the communication IC 1002, and the connectors 1009, 1010, 1011, 1012, and 1013. The CPU 1003 communicates with the reader unit 1 through the communication IC 1002. The CPU 1003 communicates with the FAX unit 4 through the connector 1009. Similarly, the CPU 1003 communicates with the file unit 5 through the connector 1010; the computer interface unit 7 through the connector 1011; the format unit 8 through the connector 1012; and the image memory unit 9 through the connector 1013.

Signal flows between the core unit 10 and the respective units will be described below.

Control executed when the core unit 10 outputs information to the FAX unit 4 will be described below. The CPU 1003 communicates with the CPU 122 of the reader unit 1 through the communication IC 1002 to issue an original scan command. In response to this command, the CPU 122 of the reader unit 1 causes the scan unit 104 to scan an original, and outputs image information through the connector 120. The read unit 1 and the external apparatus 3 are connected to each other through a cable, and information from the reader unit 1 is input to the core unit 10 through the connector 1001. The image information input through the connector 1001 is input to the binary circuit 1004 through the 8-bit multi-value signal line 1054. The binary circuit 1004 converts an 8-bit multi-value signal into a binary signal. The binary signal is input to the selector 1008 and the rotation circuit 1005 through the signal line 1055. The output signal from the rotation circuit 1005 is also input to the selector 1008 through the signal line 1056. The selector 1008 selects one of the binary signal from the binary circuit 1004 and the output signal from the rotation circuit 1005. The signal to be selected is determined upon communication between the CPU 1003 with the FAX unit 4 through the CPU bus 1053. The binary signal from the selector 1008 is sent to the FAX unit 4 through the signal line 1058 and the connector 1009.

Control executed when the core unit 10 receives information from the FAX unit 4 will be described below. Image information from the FAX unit 4 is transmitted on the signal line 1058 as a binary signal through the connector 1009. The selector 1008 outputs the binary signal onto the signal line 1055 or 1056 according to an instruction from the CPU 1003. When the signal line 1055 is selected, the binary signal from the FAX unit 4 is subjected to rotation processing by the rotation circuit 1005, and is then input to the enlargement circuit 1007. When the signal line 1056 is selected, the binary signal from the FAX unit 4 is directly input to the enlargement circuit 1007 without being subjected to the rotation processing. The enlargement circuit 1007 converts the input binary signal into an 8-bit multi-value signal, and executes enlargement processing of the multi-value signal based on the linear interpolation method. The 8-bit multi-value signal from the enlargement circuit 1007 is supplied to the reader unit 1 through the connector 1001. The reader unit 1 inputs this signal to the external I/F change-over circuit 119 through the connector 120. The external I/F change-over circuit 119 inputs the 8-bit multi-value signal from the FAX unit 4 to the brightness signal generation•color detection circuit 113. The output signal from the brightness signal generation•color detection circuit 113 is subjected to the above-mentioned processing, and is then output to the printer unit 2, thus executing image formation onto a transfer sheet.

The computer interface unit 7 will be described below.

The computer interface unit 7 interfaces with the computer 11 connected to the external apparatus 3. The computer interface unit 7 has SCSI, RS232C, and Centronics interfaces. Information from each interface is supplied to the CPU 1003 through the connector 1011 and the CPU bus 1053. The CPU 1003 performs various control operations on the basis of the content supplied from the computer 11.

The format unit 8 will be described below.

The format unit 8 has a function of developing command data such as a document file sent from the computer interface unit 7 into image data. When the CPU 1003 determines that data sent from the computer interface unit 7 through the CPU bus 1053 is code data associated with the format unit 8, it transfers the data to the format unit 8 through the connector 1012. The format unit 8 converts the transferred code data into image data, and stores the image data in the memory.

A procedure for receiving information from the format unit 8 and performing image formation onto a transfer sheet will be described below. Image information from the format unit 8 is transmitted on the signal line 1058 as a binary signal through the connector 1012. The binary image signal transmitted on the signal line 1058 is input to the selector 1008. The selector 1008 outputs the signal on the line 1058 to the signal line 1055 or 1056 according to an instruction from the CPU 1003. When the signal line 1055 is selected, the image signal is subjected to rotation processing by the rotation circuit 1005, and is then input to the enlargement circuit 1007. When the signal line 1056 is selected, the binary signal from the FAX unit 4 is directly input to the enlargement circuit 1007 without being subjected to the rotation processing. The enlargement circuit 1007 converts the binary image signal into an 8-bit multi-value signal, and supplies the multi-value signal to the reader unit 1 through the connector 1001. The information from the format unit 8 supplied to the reader unit 1 is output to the printer unit 2, and image formation is performed on a transfer sheet in the same manner as information from the FAX unit.

Figure 5:
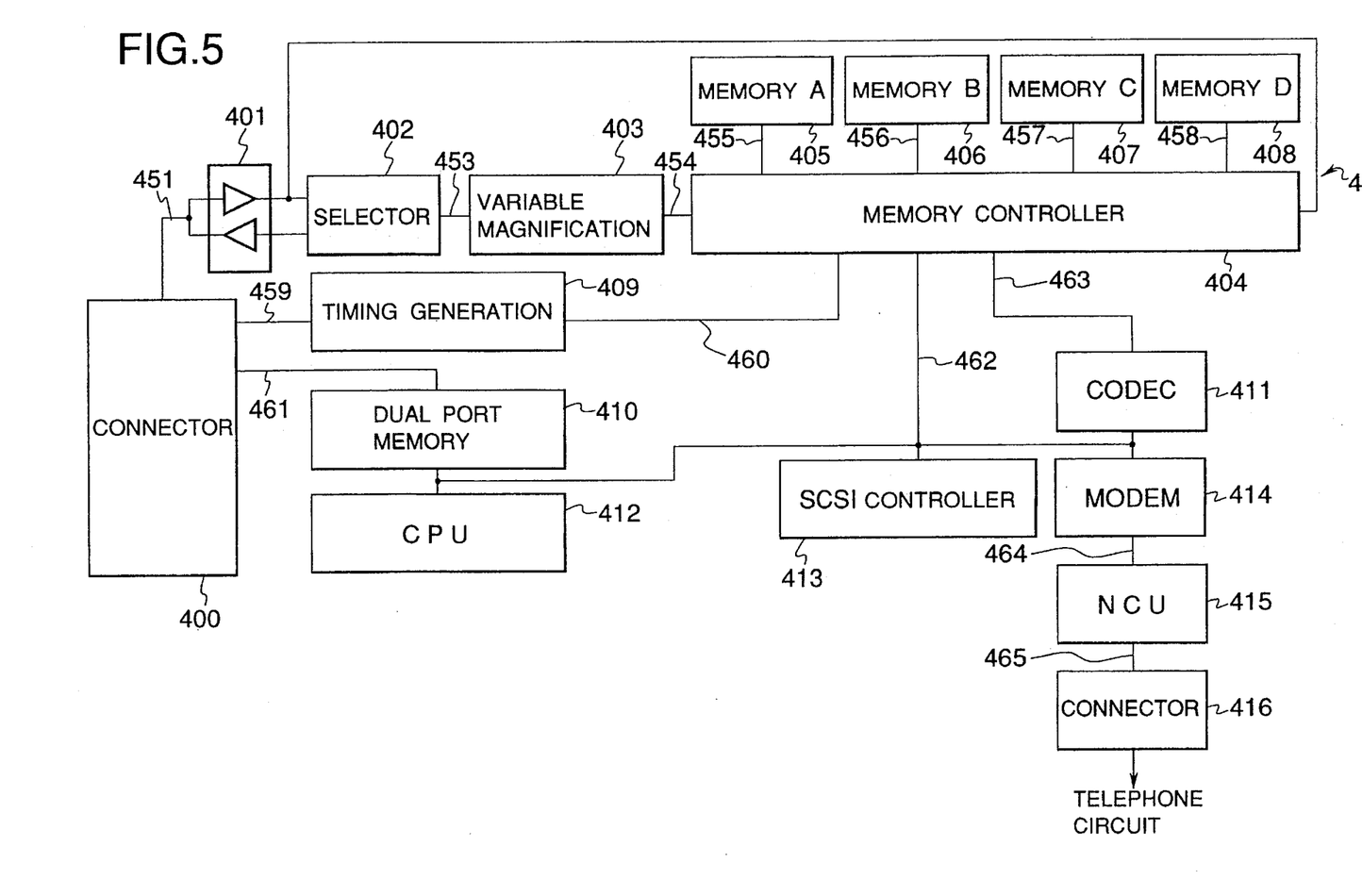
FIG. 5 is a block diagram showing an arrangement of a facsimile (FAX) unit 4.

The details of the FAX unit 4 will be described below with reference to FIG. 5. A connector 400 of the FAX unit 4 is connected to the connector 1001 of the core unit 10 through a cable.

The FAX unit 4 exchanges various signals with the core unit 10 through the connector 400. A signal line 451 extending from the connector 400 is a bidirectional binary image signal line, and is connected to a buffer 401. The buffer 401 demultiplexes a signal from the bidirectional signal line 451 into an output signal (a signal line 452) from the FAX unit 4 and an input signal (a signal line 453) to the FAX unit 4. The signals on the signal lines 452 and 453 are input to a selector 402, and the selector 402 selects one of these signal lines 452 and 453 according to an instruction from a CPU 412. More specifically, when binary information from the core unit 10 is stored in one of memories A 405 to D 408, the selector 402 selects the signal line 453. When data is transferred from one of the memories A 405 to D 408 to another memory, the selector 402 selects the signal line 452. The output signal from the selector 402 is input to a variable magnification circuit 403 through the signal line 453, and is subjected to variable magnification processing. When information read at a resolution of 400 dpi by the reader unit 1 is to be facsimile-transmitted, the variable magnification circuit 403 converts the resolution in correspondence with that of a receiving facsimile apparatus. The output signal from the variable magnification circuit 403 is input to a memory controller 404 through a signal line 454, and is stored in one of the memories A 405, B 406, C 407, and D 408 under the control of the memory controller 404. The memory controller 404 has four functions, i.e., a mode for exchanging data between the memories A 405, B 406, C 407, and D 408 and a CPU bus 462 according to an instruction from the CPU 412, a mode for exchanging data with a CODEC bus 463 of a CODEC 411 having an encoding/decoding function, a mode for storing binary video input data on the signal line 454 in one of the memories A 405 to D 408 under the control of a timing signal generation circuit 409, and a mode for reading out a memory content of one of the memories A 405 to D 408, and outputting the readout memory content onto the signal line 452. Each of the memories A 405, B 406, C 407, and D 408 has a capacity of 2 Mbytes, and thus can store an image corresponding up to A4 size at a resolution of 400 dpi. The timing signal generation circuit 409 is connected to the connector 400 through a signal line 459, is enabled in response to control signals (HSYNC, HEN, VSYNC, and VEN) from the core unit 10, and generates signals for executing the following two functions. One function is a function of storing an image signal from the core unit 10 in one of the memories A 405 to D 408, and the other function is a function of reading out data from one of the memories A 405 to D 408, and transmitting the readout data onto the signal line 452. A dual port memory 410 is connected to the CPU 1003 of the core unit 10 through a signal line 461, and is also connected to the CPU 412 of the FAX unit 4 through the signal line 462. The CPUs exchange commands through this dual port memory 410. An SCSI controller 413 interfaces with a hard disk unit connected to the FAX unit 4 (FIG. 1), and stores data in a facsimile transmission/reception mode. The CODEC 411 reads out image information stored in one of the memories A 405 to D 408, decodes the readout information according to a desired one of MH, MR, and MMR methods, and stores the decoded information in one of the memories A 405 to D 408. The CODEC 411 reads out encoded information stored in one of the memories A 405 to D 408, decodes the readout information according to a desired one of the MH, MR, and MMR methods, and stores the information as encoded or image information, in one of the memories A 405 to D 408. A MODEM 414 has a function of modulating encoded information from the CODEC 411 or the hard disk unit connected to the SCSI controller 413 to transmit it into a telephone circuit, and a function of demodulating information sent from an NCU 415 to encoded information, and transferring the encoded information to the CODEC 411 or the hard disk unit connected to the SCSI controller 413. The NCU 415 is connected to the telephone circuit through a connector 416, and exchanges information with an exchanger equipped in a telephone office according to a predetermined procedure.

Operation control in a facsimile transmission mode will be described below. A binary image signal from the reader unit 1 is input through the connector 400, and is input to the buffer 401 via the signal line 451. The buffer 401 demultiplexes the signal on the signal line 451 according to setting of the CPU 412, and outputs signals onto the signal lines 452 and 453. The signal on the signal line 453 is supplied to the variable magnification circuit 403 through the selector 402. The variable magnification circuit 403 converts a resolution of 400 dpi of the signal on the signal line 453 determined by the reader unit 1 into a resolution suitable for the facsimile transmission mode. The output signal from the variable magnification circuit 403 is stored in the memory A 405 through the signal line 405 under the control of the memory controller 404. The storage timing in the memory A 405 is generated by the timing signal generation circuit 409 according to a timing signal input from the reader unit 1 through the signal line 459. The CPU 412 connects the memories A 405 and B 406 of the memory controller 404 to the bus line 463 of the CODEC 411. The CODEC 411 reads out image information from the memory A 405, encodes the readout image information according to the MR method, and writes the encoded information in the memory B 406. When the CODEC 411 encodes A4-size image information, the CPU 412 connects the memory B 406 of the memory controller 404 to the CPU bus 462. The CPU 412 sequentially reads out the encoded information from the memory B 406, and transfers it to the MODEM 414. The MODEM 414 modulates the encoded information, and facsimile-transmits the modulated image information onto the telephone circuit through the NCU.

Operation control in the facsimile reception mode will be described below. A calling signal sent from the telephone circuit is input to the NCU 415, and the NCU 415 connects the telephone circuit according to a predetermined procedure. Information from the telephone circuit is input to and demodulated by the MODEM 414 through the NCU 415. The CPU 412 stores the information from the MODEM 414 in the memory C 407 through the CPU bus 462. When the information for one frame is stored in the memory C 407, the CPU 412 controls the memory controller 404 to connect the signal line 457 of the memory C 407 to the line 463 of the CODEC 411. The CODEC 411 sequentially reads out encoded information in the memory C 407, decodes the encoded information, and stores the encoded image information in the memory D 408. The CPU 412 communicates with the CPU 1003 of the core unit 10 through the dual port memory 410, and performs a setting operation for printing out an image by the printer unit 2 from the memory D 408 through the core unit 10. Upon completion of the setting operation, the CPU 412 enables the timing signal generation circuit 409, and the generation circuit 409 outputs a predetermined timing signal to the memory controller through a signal line 460. The memory controller 404 reads out image information from the memory D 408 in synchronism with the timing signal from the timing signal generation circuit 409, inputs the readout information to the buffer 401 through the signal line 452, and then outputs the information to the connector 400 through the signal line 451. An operation until information is output from the connector 400 to the printer unit 2 has already been described in the paragraph of the core unit, and a detailed description thereof will be omitted.

When a facsimile transmission/reception operation is performed between apparatuses of this embodiment, and especially when a document file from the interface unit 7 is to be processed, if a receiving apparatus has no format unit, command data can be developed by the format unit 8 of a transmitting apparatus, and the developed data can be sent to and encoded by the FAX unit 4 through the core unit 10. However, if the receiving apparatus has a format unit, since command data from the computer has a smaller data amount than that of encoded image data, command data from the interface unit 7 is supplied to the FAX unit 4, and is transmitted in place of the encoded image data. The receiving apparatus supplies the command data to the format unit, develops it into bit map data, and outputs the bit map data from the printer unit. Thus, not only the communication time can be shortened, but also high image quality can be attained.

An arrangement for color-pattern conversion for converting a color image in a read original image into a pattern image will be described below.

Figure 6:
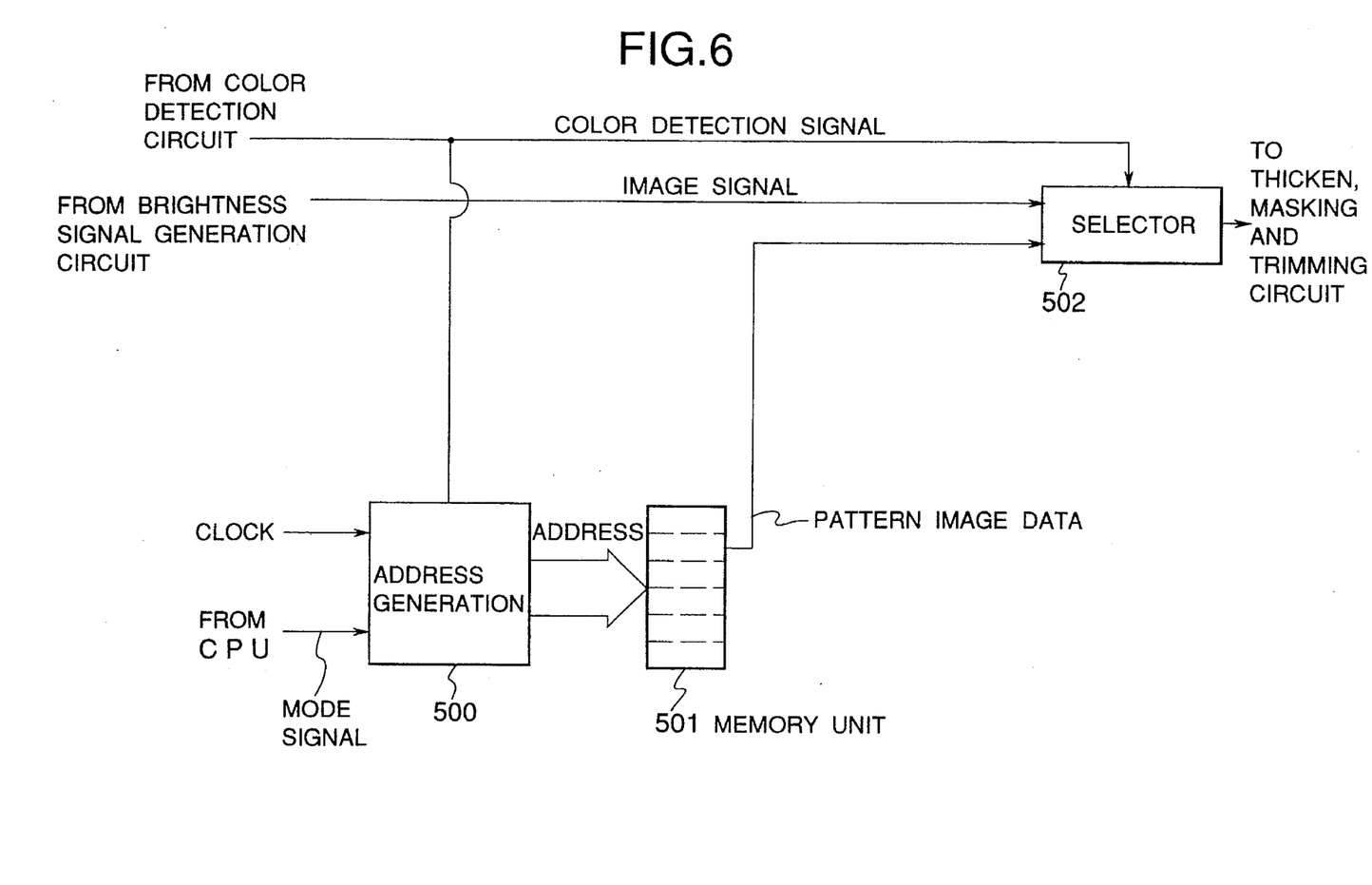
FIG. 6 is a block diagram showing an arrangement of a pattern circuit.

FIG. 6 shows an arrangement for a circuit for performing pattern conversion in the pattern circuit 117. A memory unit 501 stores pattern image data used for converting a color image into a pattern image.

Figure 7:
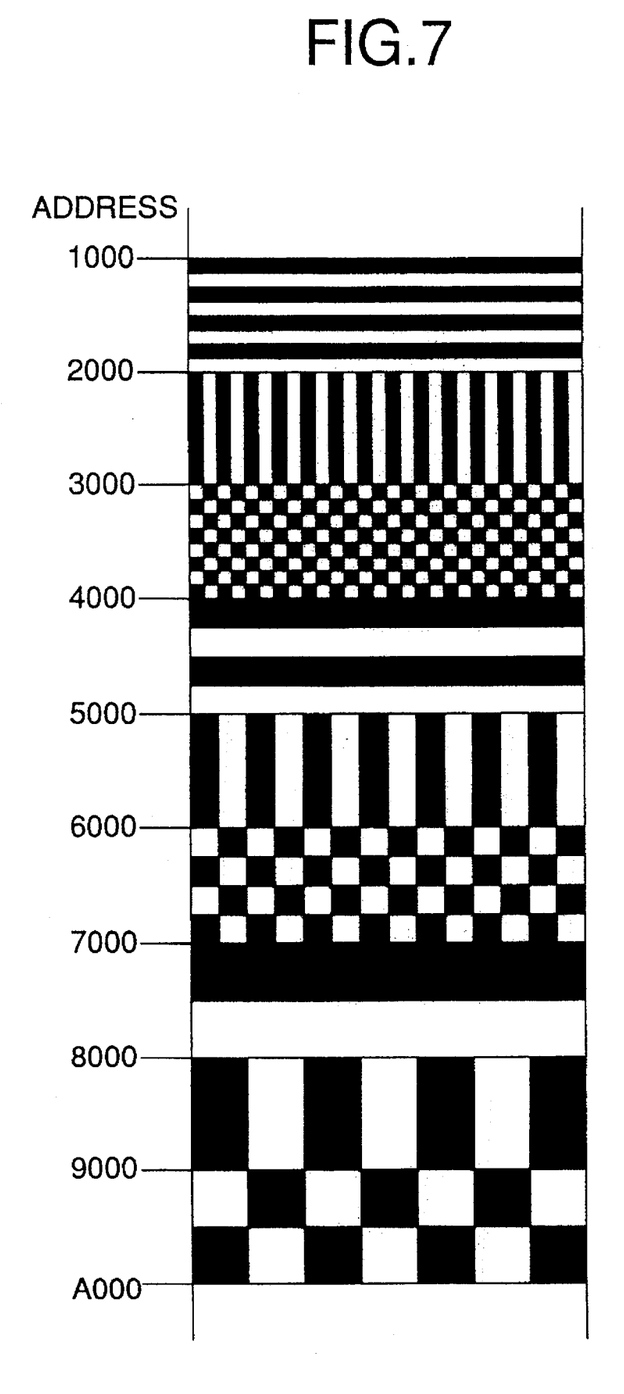
FIG. 7 is a view showing data stored in a memory unit 501.

FIG. 7 shows pattern image data stored at respective addresses of the memory unit 501. At addresses 1000 to 3FFF, pattern image data to be read out in a print mode is stored; at addresses 4000 to 6FFF, pattern image data to be read out in a fine mode in the facsimile transmission mode is stored; and at addresses 7000 to 9FFF, pattern image data to be read out in a normal mode in the facsimile transmission mode is stored. Furthermore, at addresses 1000 to 1FFF, addresses 4000 to 4FFF, and addresses 7000 to 7FFF, pattern image data corresponding to a blue image is stored; at addresses 2000 to 2FFF, addresses 5000 to 5FFF, and addresses 8000 to 8FFF, pattern image data corresponding to a red image is stored; and at addresses 3000 to 3FFF, addresses 6000 to 6FFF, and addresses 9000 to 9FFF, pattern image data corresponding to a yellow image is stored. The pattern image at the addresses 1000 to 3FFF is a pattern image in units of 2 pixels; the pattern image at the addresses 4000 to 6FFF is a pattern image in units of 4 pixels, and the pattern image at the addresses 7000 to 9FFF is a pattern image in units of 8 pixels. An address generation circuit 500 (FIG. 6) includes a counter for counting from 000 to FFF. When an image signal begins to be input, the counter increments the count value in synchronism with clocks of the image signal, and when the count value reaches FFF, the counter is reset to 000. The address generation circuit 500 designates the address of the memory unit 501 on the basis of the count value of its internal counter, a color detection signal from the color detection circuit 113, and a mode signal from the CPU 122. Therefore, the pattern image data in the memory unit 501 is read out in synchronism with clocks of the image signal. Note that the memory unit 501 outputs one pixel of an image signal as an 8-bit signal.

When the color detection signal from the color detection circuit 113 is input, a selector 502 selects a pattern image signal from the memory unit 501; when the color detection signal from the color detection circuit 113 is not input, it selects an image signal from the memory unit 501 so as to convert a color-detected region into a pattern image. The image signal selected by the selector 502 is input to a thicken•masking circuit in the pattern circuit 117, and is then output to the printer unit 2 through the laser driver 118.

Figure 8:
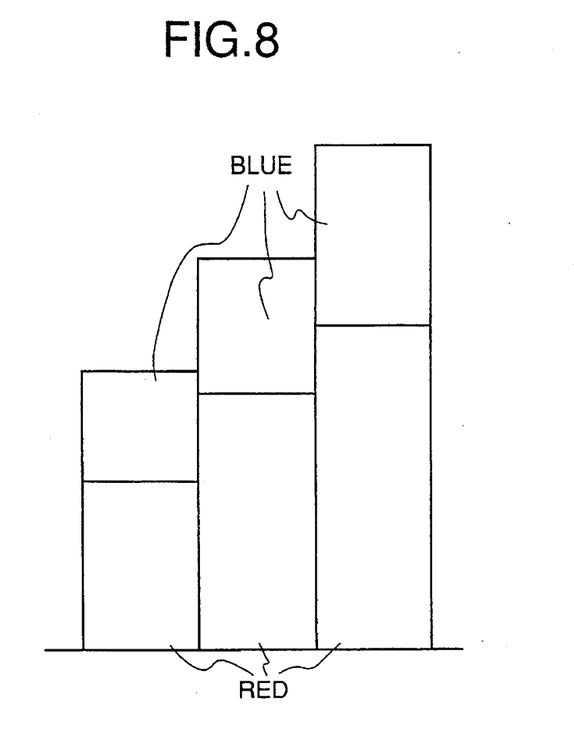
FIG. 8 is a view showing an original image.
Figure 9:
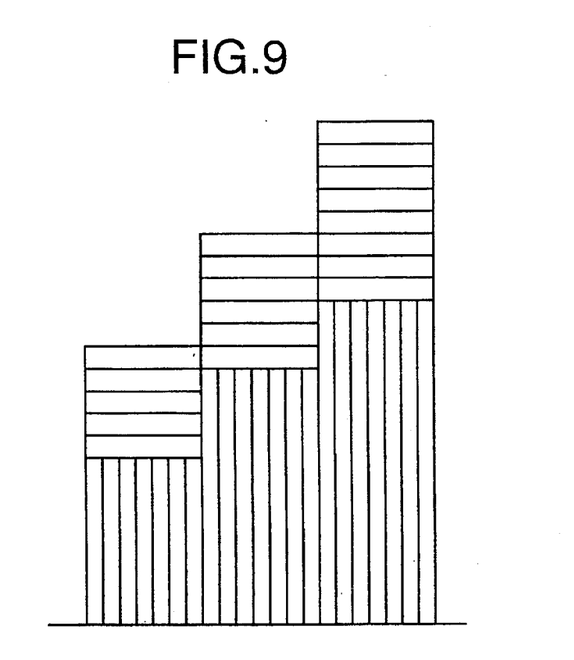
FIG. 9 is a view showing a result of color-pattern conversion of the original image shown in FIG. 8.

Upon operation of the address generation circuit 500 and the selector 502, a color-detected region in an original image is converted into a pattern image, and a non-color-detected region is output as an original image. Thus, a bar graph including blue and red bars shown in FIG. 8 is converted into a monochrome pattern image shown in FIG. 9, and the converted image is output.

Figure 10A:
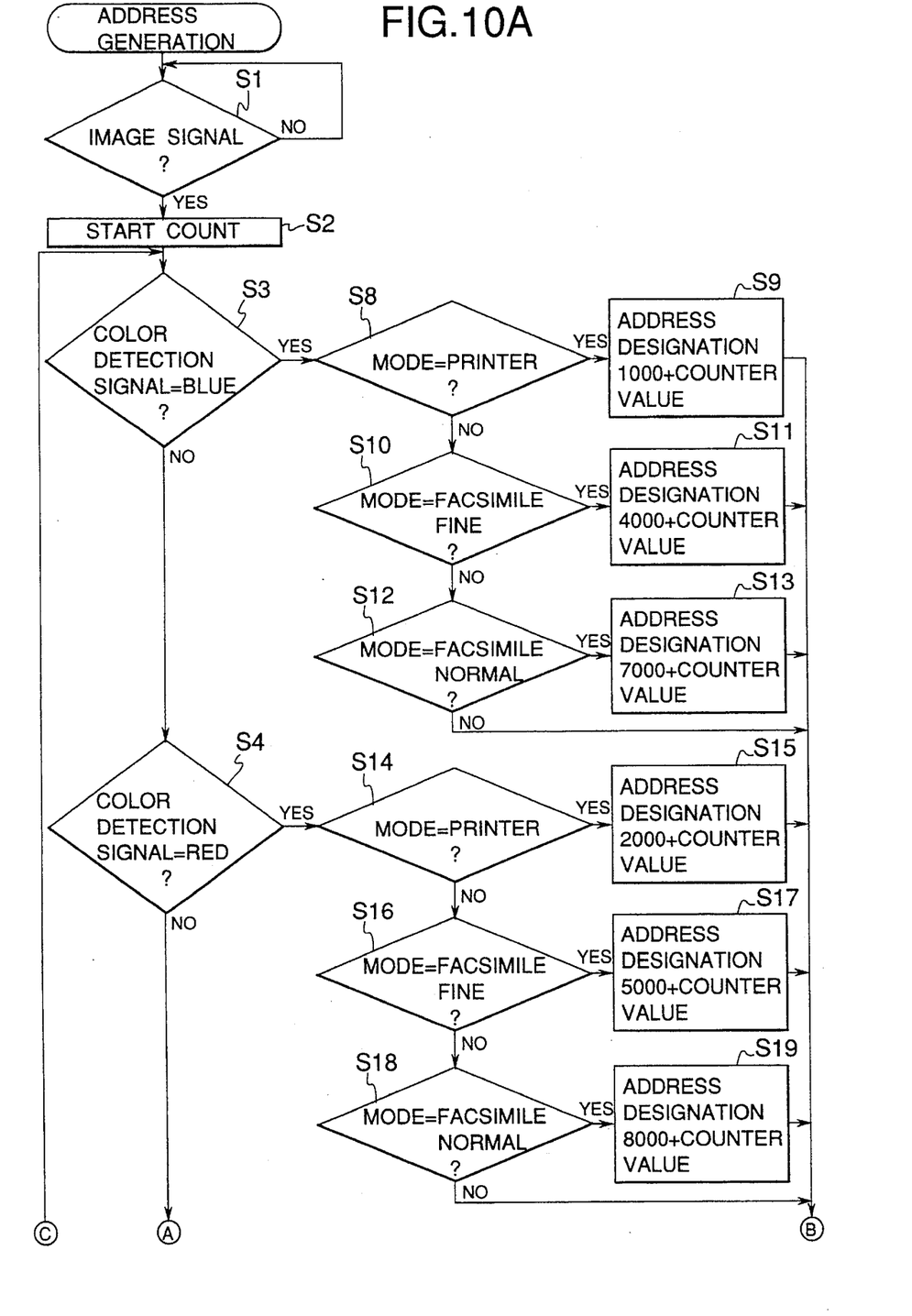
FIGS. 10A and 10B are flow charts showing an operation of an address generation circuit 500.
Figure 10B:
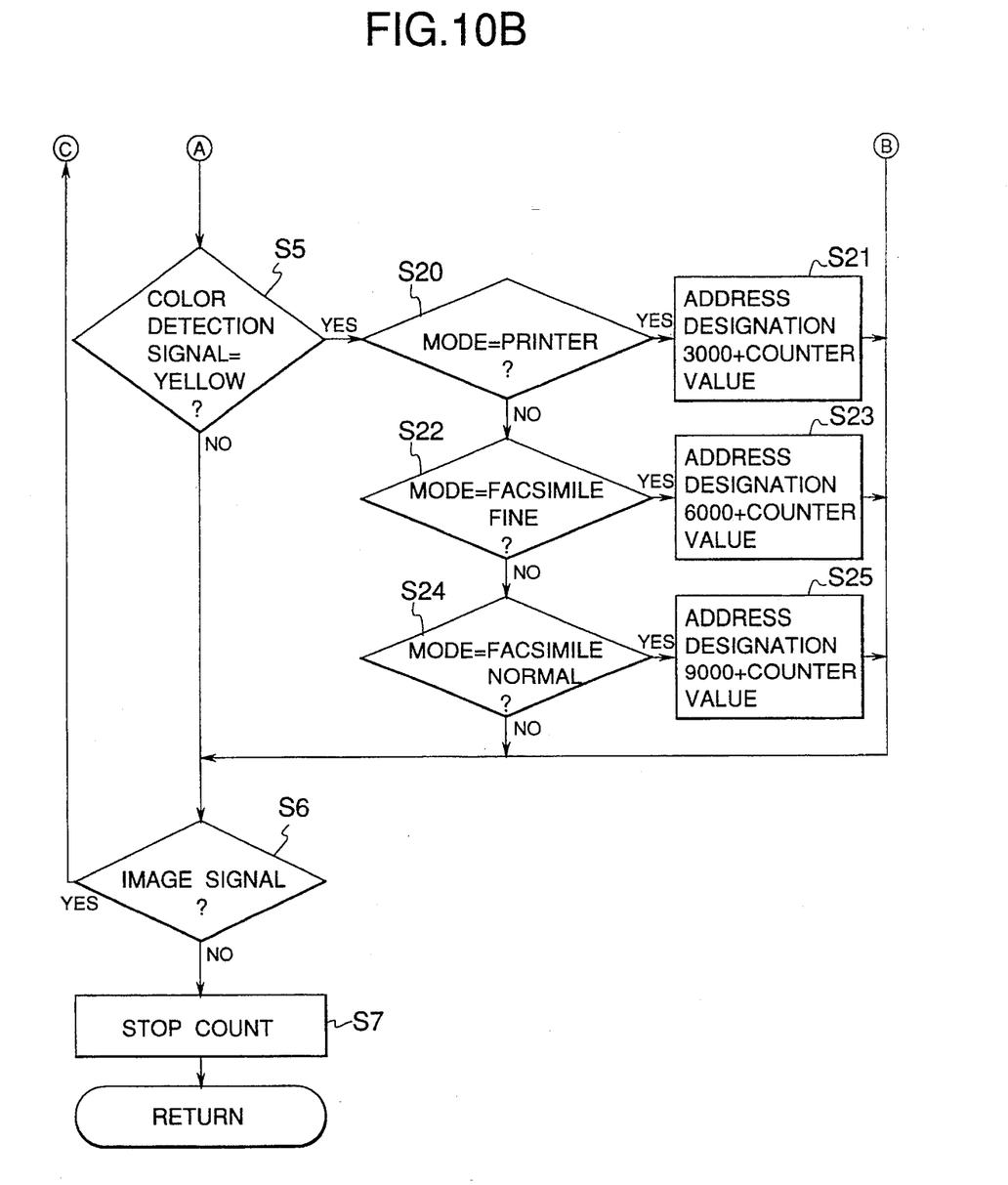

An address generation operation for the memory unit 501 will be described below with reference to the flow charts of FIGS. 10A and 10B, which show the operation of the address generation circuit 500. When an image signal begins to be input (step S1), the count operation of the counter is started (step S2). The counter increments the count value from 000, and when the count value reaches FFF, the counter restarts the count operation from 000. When the color detection signal indicates blue, and the mode signal indicates the print mode (steps S3 and S8), the circuit 500 designates an address by (1000+count value) (step S9); when the color detection signal indicates blue, and the mode signal indicates the facsimile fine transmission mode (steps S3 and S10), it designates an address by (4000+count value) (step S11); when the color detection signal indicates blue, and the mode signal indicates the facsimile normal transmission mode (steps S3 and S12), it designates an address by (7000+count value) (step S13); when the color detection signal indicates red, and the mode signal indicates the printer mode (steps S4 and S14), it designates an address by (2000+count value) (step S15); when the color detection signal indicates red, and the mode signal indicates the facsimile fine transmission mode (steps S4 and S16), it designates an address by (5000+count value) (step S17); and when the color detection signal indicates red, and the mode signal indicates the facsimile normal transmission mode (steps S4 and S18), it designates an address by (8000+count value) (step S19). When the color detection signal indicates yellow, and the mode signal indicates the printer mode (steps S5 and S20), the circuit 500 designates an address by (3000+count value) (step S21); when the color detection signal indicates yellow, and the mode signal indicates the facsimile fine transmission mode (steps S5 and S22), the circuit 500 designates an address by (6000+count value) (step S23); and when the color detection signal indicates yellow, and the mode signal indicates the facsimile normal transmission mode (steps S5 and S24), the circuit 500 designates an address by (9000+count value) (step S25). It is then checked if the image signal is input (step S6). If YES in step S6, the flow returns to step S3; otherwise, the count operation of the counter is stopped (step S7), and the flow returns.

Figure 11A:
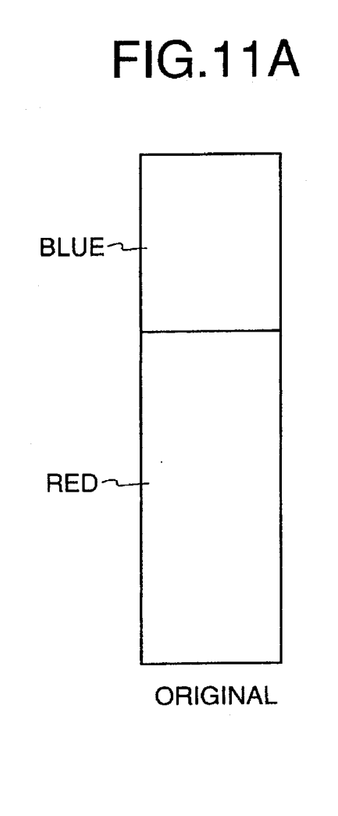
FIGS. 11A to 11D are views showing color-pattern conversion results in corresponding modes.
Figure 11B:
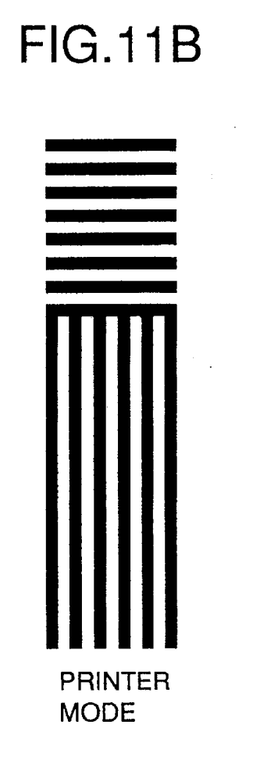
Figure 11C:
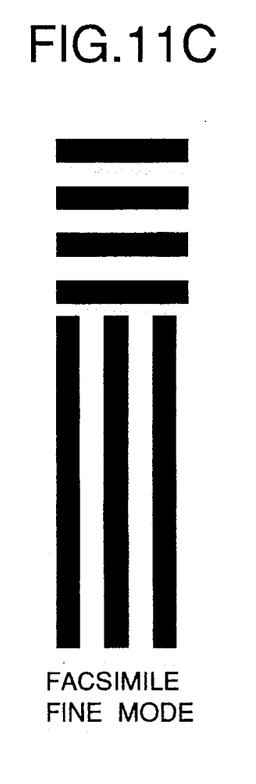
Figure 11D:
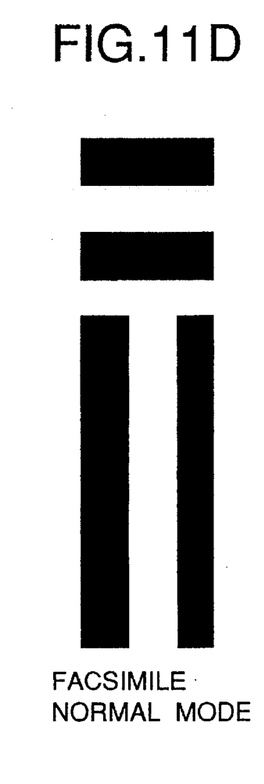

FIGS. 11A to 11D show an original image, and color-pattern-converted images. FIG. 11A shows an original image painted in blue and red. When the original image shown in FIG. 11A is color-pattern-converted in the print mode, an image shown in FIG. 11B is obtained. When the original image is color-pattern-converted in the facsimile fine transmission mode, an image shown in FIG. 11C is obtained. When the original image is color-pattern-converted in the facsimile normal transmission mode, an image shown in FIG. 11D is obtained.

When the facsimile transmission mode is the fine mode (16 pel/mm in the main scanning direction, 15.4 line/mm in the subscanning direction), the data amount is large. In order to decrease the data amount, in this case, pattern conversion may be inhibited without supplying the color detection signal to the selector 502. When the pattern conversion mode is selected by the operation unit, the transmission mode may be automatically changed from the fine mode to the normal mode (8 pel/mm in the main scanning direction, 7.7 line/mm in the subscanning direction) to transmit data.

In this manner, a pattern image is output while changing its resolution according to the transmission mode, and a color image can be converted into a pattern image according to the resolution of the selected mode. For this reason, an original image can be output without losing its color information.

Another embodiment of the present invention will be described below.

Figure 12:
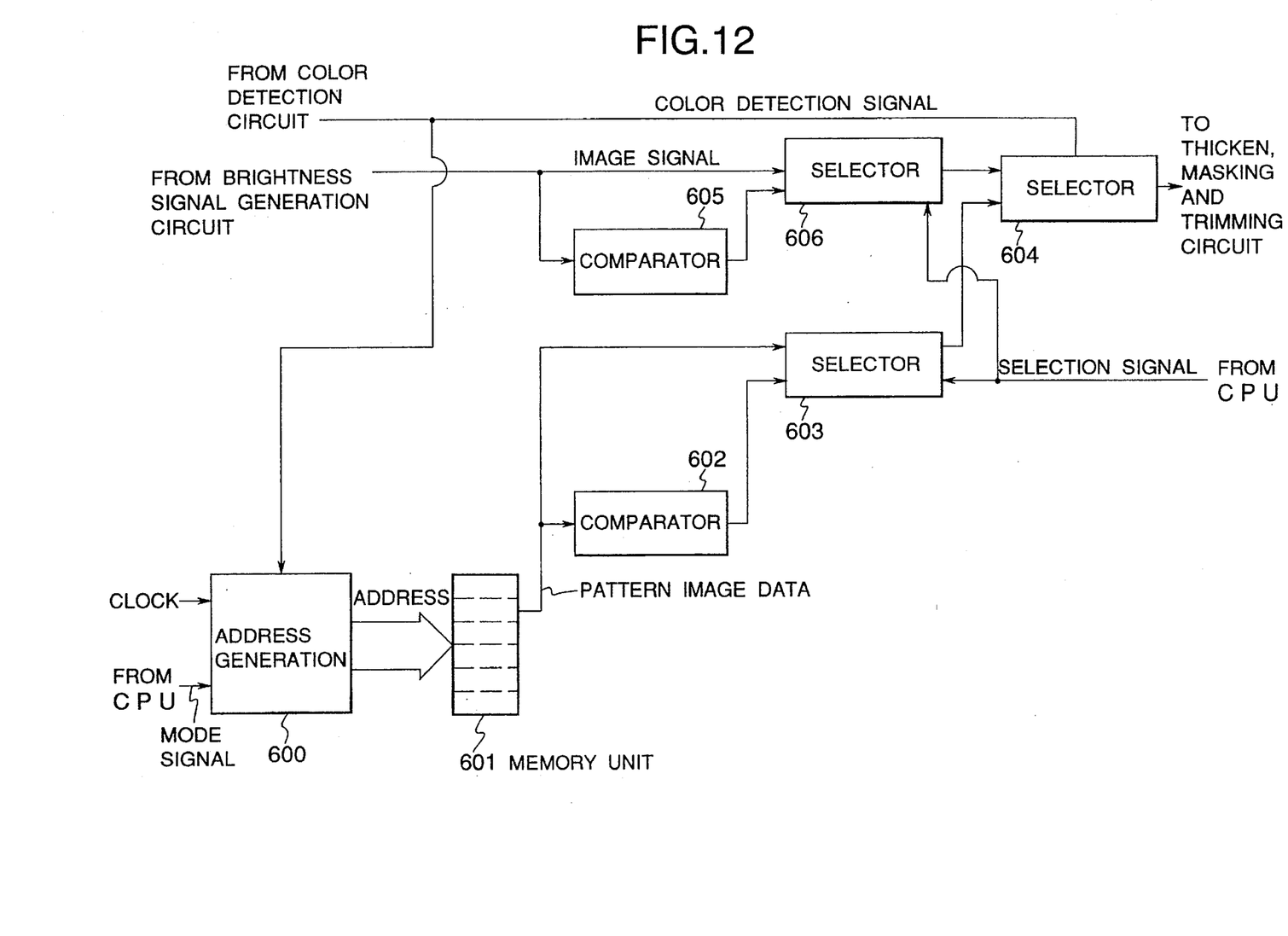
FIG. 12 is a block diagram showing an arrangement of a pattern circuit according to another embodiment of the present invention.

FIG. 12 shows an arrangement of a pattern circuit. The pattern circuit includes an address generation circuit 600 for outputting an address designation signal according to whether an output mode is a print mode or a facsimile transmission mode, or a fine mode or a normal mode in the facsimile transmission mode, a memory unit 601 for storing pattern image data to be output, a comparator 602 for converting 8-bit multi-value data from the memory unit 601 into binary data (00hex and FFhex), a selector 603 for selecting one of the output from the comparator 602 and the output from the memory unit 601 according to a selection signal from a CPU 123, which signal indicates the print mode or the facsimile transmission mode, and a selector 604 for selecting one of the output from the selector 603 and the output from a marker area determination•outline generation circuit 116 (FIG. 3).

In the print mode, 8-bit multi-value pattern data stored in the memory unit 601 is selected.

Data corresponding to a pattern image portion in the print mode is output as A0hex. The selector 603 selects the memory output without going through the comparator 602, and the selector 604 selects a pattern image output for a region corresponding to a color detection signal. In this manner, a reproduced image is expressed by a halftone pattern.

In the facsimile transmission mode, pattern images having different resolutions are read out from the memory unit 601 depending on the fine mode or the normal mode. The output from the memory unit 601 is input to the comparator 602, and is compared with a fixed value (e.g., 80hex). The comparator 602 compares 80hex with the value of the pattern signal generated from the memory unit 601, and outputs a binary pattern consisting of 00hex and FFhex. When the signal value is smaller than 80hex, the comparator 602 outputs 00hex; when it is equal to or larger than 80hex, the comparator 602 outputs FFhex. Since the black portion of the pattern image is A0hex, the comparison result becomes FFhex. In this manner, the selector 603 selects according to the selection signal from the CPU 123, which signal indicates the print mode or the facsimile transmission mode, whether or not binary conversion of pattern image data from the memory is to be executed.

A comparator 605 and a selector 606 operate in the same manner as described above.

Thus, an image signal to be output to a FAX unit 4 is expressed as a pattern of "0" or "1".

As described above, the density of a pattern can be changed according to a multi-value or binary output, so that multi-value data is output to a multi-value output printer, and binary data is output to a binary output facsimile apparatus. The present invention is not limited to original information, but may be applied to various other color video signal processing operations, as a matter of course.

In this manner, when input image information is converted into a pattern image according to recognized colors, and the pattern image is output, the resolution or density is changed according to an output means, so that a pattern suitable for performance of the output means can be generated, and an original image can be reproduced without losing its color information.

In the image processing apparatus, detection means for receiving monochrome image data, and detecting images having a plurality of predetermined densities in the input image may be arranged, and pattern images corresponding to the densities of the image region portions of the predetermined densities may be read out and output from a memory.

In addition, an arrangement capable of changing the resolution of a reader unit may be adopted, and the resolution of a pattern image may be changed according to the resolution of the reader unit.

What is claimed is:

1. An image processing apparatus comprising an input line for inputting image information representing a color image, and conversion means for converting that image information into a repeated-pattern image containing a repeated pattern corresponding to at least one color of the input color image, wherein said conversion means controls a cycle of repetition of a repeated pattern corresponding to a color, in accordance with a type of output mode.

2. An image processing apparatus according to claim 1, wherein the type of repeated pattern is the same for at least two different output modes.

3. An image processing apparatus according to claim 1, wherein said conversion means controls the cycle of repetition according as the output mode is a printer mode or a facsimile mode.

4. An image processing apparatus according to claim 1, wherein said conversion means controls the cycle of repetition according as the output mode is a low-resolution facsimile mode or a high-resolution facsimile mode.

5. An image processing apparatus according to claim 1, further comprising setting means for setting the output mode.

6. An image processing apparatus according to claim 1, wherein said conversion means further comprises means for storing plural types of the repeated pattern images.

7. An image processing method, comprising the steps of inputting image information representing a color image, and converting that image information into a repeated-pattern image containing a repeated pattern corresponding to at least one color of the input color image, wherein said converting step includes controlling a cycle of repetition of a repeated pattern corresponding to a color, in accordance with a type of output mode.

8. An image processing method according to claim 7, wherein the type of repeated pattern is the same for at least two different output modes.

9. An image processing method according to claim 7, wherein said converting step includes controlling the cycle of repetition according as the output mode is a printer mode or a facsimile mode.

10. An image processing method according to claim 7, wherein said converting step includes controlling the cycle of repetition according as the output mode is a low-resolution facsimile mode or a high-resolution facsimile mode.

11. An image processing method according to claim 7, further comprising the step of setting the output mode.

12. An image processing method according to claim 7, wherein said converting step further comprises the step of storing plural types of the repeated pattern images.

* * * * *